(12) United States Patent
Zarkhin

(10) Patent No.: US 7,830,155 B2
(45) Date of Patent: Nov. 9, 2010

(54) TWO-WIRE ACTIVE SENSOR INTERFACE CIRCUIT

(75) Inventor: Mikhail Zarkhin, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1424 days.

(21) Appl. No.: 11/244,025

(22) Filed: Oct. 5, 2005

(65) Prior Publication Data

US 2007/0086138 A1 Apr. 19, 2007

(51) Int. Cl.
*G01R 27/02* (2006.01)
(52) U.S. Cl. .................................... 324/605
(58) Field of Classification Search .................. 324/605
See application file for complete search history.

(56) References Cited

U.S. PATENT DOCUMENTS

| | | | |
|---|---|---|---|
| 3,953,682 A | | 4/1976 | Daniels et al. |
| 5,880,614 A | * | 3/1999 | Zinke et al. ............ 327/205 |
| 6,133,822 A | * | 10/2000 | Pfandler et al. ......... 375/258 |
| 6,208,175 B1 | * | 3/2001 | Zydek et al. ............ 327/75 |
| 6,282,954 B1 | * | 9/2001 | Ott et al. .................. 73/488 |
| 2004/0066183 A1 | * | 4/2004 | Lohberg et al. ......... 324/166 |
| 2004/0075450 A1 | * | 4/2004 | Buge et al. .............. 324/710 |
| 2005/0007094 A1 | * | 1/2005 | Hill ........................ 324/117 H |

\* cited by examiner

*Primary Examiner*—Timothy J Dole
(74) *Attorney, Agent, or Firm*—Ralph E. Smith

(57) ABSTRACT

A two-wire active sensor interface circuit includes a constant current circuit adapted to be coupled to a two-wire active sensor for receipt of a sensor current signal indicating one of two sensor states. The constant current circuit provides a preselected constant current amount positioned between the two sensor states that vary the sensor current signal thereby generating a current level indicator signal. Additionally, the two-wire active sensor interface circuit includes a digital interface circuit operably coupled to the constant current circuit for receipt of the current level indicator signal and produces an interface output indicating which of the two sensor states is present.

17 Claims, 3 Drawing Sheets

TWO-WIRE ACTIVE SENSOR INTERFACE CIRCUIT

FIELD OF THE INVENTION

The present invention relates to a two-wire active sensor providing an output in a form of an electrical current. More specially, it relates to a two-wire active sensor interface circuit receiving and transforming a current signal sent by the two-wire active sensor into a voltage signal output for an information gathering system.

BACKGROUND OF THE INVENTION

One conventional system used to communicate information generated by a two-wire active sensor to an information gathering system utilizes the two-wire active sensor to send a sensor current signal to a current limiting circuit that protects remaining portions of the two-wire active sensor interface circuit against faults and/or high voltage conditions, such as a short to battery. For example, if the short to battery occurs, the current limiting circuit interrupts the current flow to a current-to-voltage converter circuit by drastically increasing the input impedance. Otherwise, the current limiting circuit sends the sensor current signal to the current-to-voltage converter circuit. The current-to-voltage converter circuit transforms the sensor current signal into a voltage signal. A comparator circuit compares the voltage signal against a voltage threshold to determine a state represented by the sensor current signal output of the two-wire active sensor. The comparator circuit sends an output signal representing the state to a digital interface circuit. The digital interface circuit converts the output signal into a signal recognized by the information gathering system.

In order to reduce the number of components in a two-wire active sensor interface circuit and minimize costs, it may be desirable to provide an alternative two-wire active sensor interface circuit to transform the current signal produced by a two-wire active sensor into an output recognized by an information gathering system.

SUMMARY OF THE INVENTION

In accordance with the present invention, a two-wire active sensor interface circuit is provided. One aspect of the present invention includes a constant current circuit adapted to be coupled to a two-wire active sensor for receipt of a sensor current signal indicating one of two sensor states. The constant current circuit provides a preselected constant current positioned between the two sensor state current levels that varies the sensor current signal thereby generating a current level indicator signal. Additionally, the two-wire active sensor interface circuit comprises a digital interface circuit operably coupled to the constant current circuit for receipt of the current level indicator signal and operative to produce an interface output indicating which of the two sensor states is present.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
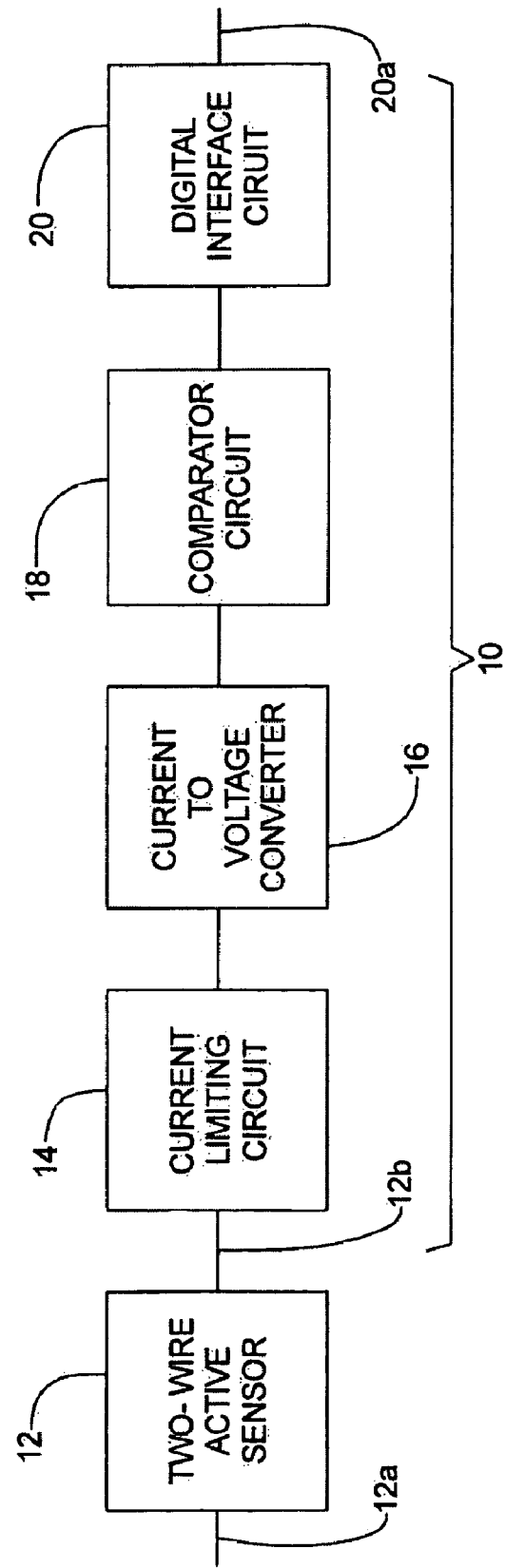
FIG. 1 is a block diagram of a prior art two-wire active sensor interface circuit in a vehicle.

FIG. 1 sets forth a block diagram of a prior art two-wire active sensor interface circuit 10 and a two-wire active sensor 12 for converting a sensor current signal into a voltage output for an information gathering system (not shown). The two-wire active sensor interface circuit 10 includes a current limiting circuit 14, a current-to-voltage converter circuit 16, a comparator circuit 18, and a digital interface circuit 20.

An input 12a of a two-wire active sensor 12 is coupled to a dynamic source (not shown). An output 12b of a two-wire active sensor 12 is coupled to the two-wire active sensor interface circuit 10 via the current limiting circuit 14. The current limiting circuit 14 is, in turn, coupled to the current-to-voltage converter circuit 16. The current-to-voltage converter circuit 16 is, in turn, coupled to the comparator circuit 18. In addition, the comparator circuit 18 is coupled to the digital interface circuit 20.

The two-wire active sensor 12 includes any conventional two-wire active sensor that is operational to sense a change in value or in a physical quality (e.g. temperature, pressure, flow rate, vehicle speed, wheel speed, illumination levels etc.) through the input 12a produced by the dynamic source. For exemplary purposes only, the two-wire active sensor 12 may comprise an active wheel speed sensor manufactured by Robert Bosch Corp., Farmington Hills, Mich. Additionally, the two-wire active sensor 12 converts that change into a current signal produced via the output 12b for use by an information gathering system. The current signal comprises a current pulse train. The two-wire active sensor 12 modulates the current pulse train signal between a high current level and a low current level to indicate the change in value or in the physical quality.

The dynamic source may include any source which changes in value or physical quality that may be detected and/or measured by the two-wire active sensor 12.

The current limiting circuit 14 is operative to receive the current signal produced by the two-wire active sensor 12 and protect a remaining portion of the two-wire active sensor interface circuit from faults including high voltage conditions, such as a short to battery. For example, if the short to battery occurs, the current signal will exceed a maximum current threshold defined by the current limiting circuit 14, the current limiting circuit 14 interrupts the current flow to the current-to-voltage converter circuit 16 from the two-wire active sensor 12.

During normal operation, the current-to-voltage converter circuit 16 is operative to receive the current signal from the current limiting circuit 14 and convert the current signal into the voltage signal. The voltage signal is then received by the comparator circuit 18.

The comparator circuit 18 receives the voltage signal from the current-to-voltage converter circuit 16 to determine the sensor state indicated by the sensor current signal. The comparator circuit 18 compares the voltage signal to a voltage threshold. Based on the comparison, the comparator circuit 18 produces an output signal for the digital interface circuit 20. The digital interface circuit 20 is operative to receive the output signal and produce a voltage output recognized by the information gathering system. More specifically, the digital interface circuit 20 includes a switching device that is operable to switch from ON to OFF, or vice versa, based on the voltage output. For example, if the comparator circuit 18 determines that the voltage signal is below the voltage threshold, the digital interface circuit 20 produces a high voltage signal, for example 5V, as an input for the information gathering system. On the other hand, if the comparator circuit 18 determines that the voltage signal is above the voltage threshold, the digital interface circuit 20 outputs a low voltage signal, for example 0V, to the information gathering system.

Figure 2:
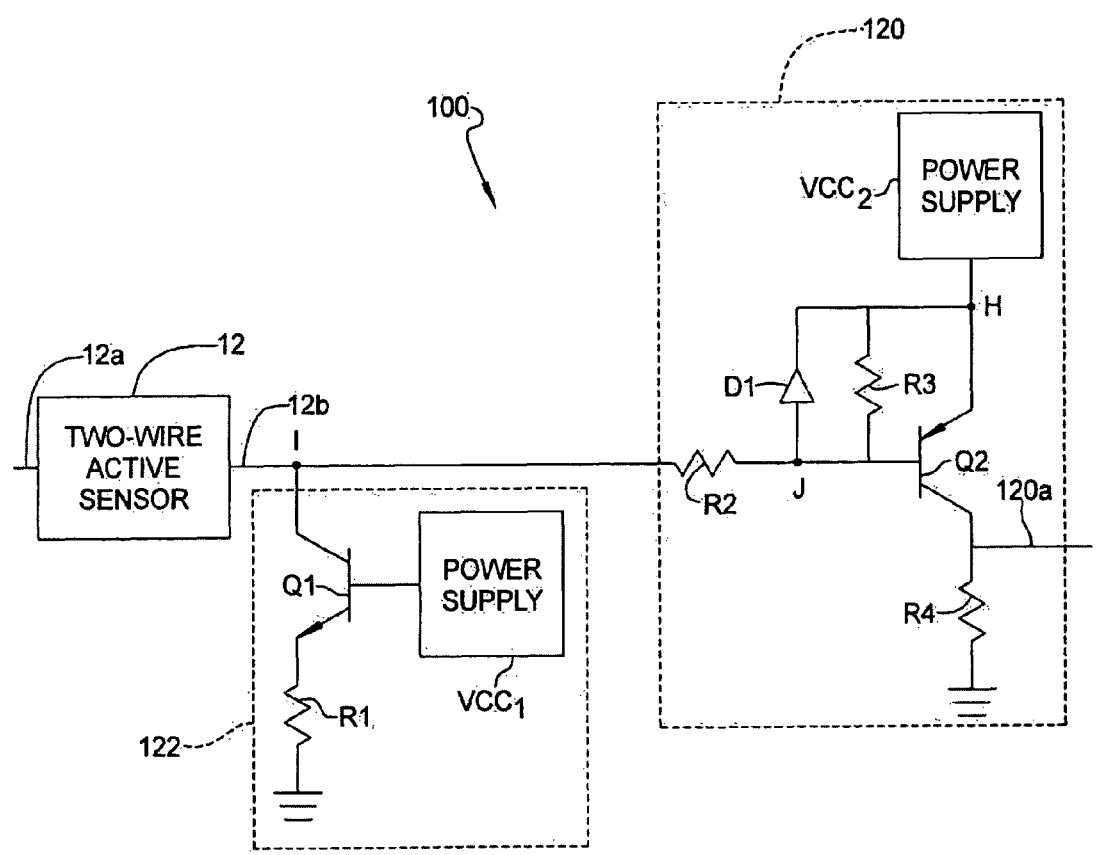
FIG. 2 is a detailed schematic of a two-wire active sensor interface circuit arranged in accordance with the principles of the invention; and, FIG. 3 is a detailed schematic of an alternative embodiment of a two-wire active sensor interface circuit arranged in accordance with the principles of the invention.

FIG. 2 shows a two-wire active sensor interface circuit 100 for converting the current signal from the two-wire active sensor 12 into the output signal for the information gathering system in accordance with the present invention. Elements in common with FIG. 1 will be identified with like reference numerals increased by 100 and the discussion of the two-wire active sensor interface circuit 100 will focus on the differences between the two-wire active sensor interface circuit 100 and the two-wire active sensor interface circuit 10.

Referring to FIG. 2, the two-wire active sensor interface circuit 100 includes a constant current circuit 122 and a digital interface circuit 120. While the functionality of the digital interface circuit 20 of FIG. 1 and the digital interface circuit 120 are the same, the digital interface circuit 120 may include additional elements in order to perform and operate with the constant current circuit 122. Additionally, the two-wire active sensor interface circuit 100 includes the constant current circuit 122 in lieu of the current limiting circuit 14, the current-to-voltage converter circuit 16, and the comparator circuit 18 of FIG. 1.

The two-wire active sensor 12 is coupled in parallel to the constant current circuit 122 and the digital interface circuit 120.

The constant current circuit 122, such as a current sink circuit, is operative to receive the current signal from an output 12b of the two-wire active sensor 12. The constant current circuit 122 is configured to drain a predetermined constant current amount. The constant current amount is indicative of a current signal positioned between the low current level and the high current level. More specifically, the constant current amount is positioned approximately halfway between the low current level and the high current level. Additionally, the constant current circuit drains an amount of current equal to the constant current amount independent of the sensor current signal as the sensor current signal between its high and low current level states.

For example, if the sensor current signal is equal to or less than the constant current amount, the constant current circuit 122 sinks the sensor current signal to ground. Additionally, if the sensor current signal is less than the constant current amount, the constant current circuit pulls additional current from the digital interface circuit 120, until the constant current circuit drains a total amount of current equal to the constant current amount. On the other hand, if the sensor current signal is greater than the constant current amount, the constant current circuit 122 drains a portion of the sensor current signal equal to the constant current amount to ground.

The constant current circuit 122 is further operative to protect any circuit coupled to the two-wire active sensor 12 from faults or high voltage conditions, such as the short to battery. During the high voltage conditions, the constant current circuit 122 limits power dissipation to the remaining portions of the two-wire active sensor interface circuit. In other words, by draining the sensor current signal, the constant current circuit 122 protects the digital interface circuit 120 from high voltage conditions by reducing the amount of current received by the digital interface circuit 120. The remaining current is indicative of the sensor current signal sent by the two-wire active sensor 12 minus the amount of current drained by the constant current circuit 122.

As shown in FIG. 2, the constant current circuit 122 includes an NPN transistor Q1. A collector of transistor Q1 is coupled to the output 12b of the two-wire active sensor 12. An emitter of transistor Q1 is coupled to one side of a resistor R1. The other side of resistor R1 is, in turn, coupled to ground. A base of transistor Q1 is coupled to power supply $V_{CC1}$.

The digital interface circuit 120 includes a resistor R2 coupled at one side to the constant current circuit 122 and the two-wire active sensor 12 at node I. The other side of resistor R2 is coupled at an anode of a diode D1 and one side of resistor R3 at node J. Additionally, coupled to node J is a base electrode of a switching transistor Q2, which opens and closes to produce a voltage output based on the amount of current received from the two-wire active sensor 12. A cathode of diode D1, the other side of resistor R3 and an emitter of transistor Q2 are coupled at node H to power supply $V_{CC2}$. A collector of transistor Q2 is coupled to one side of resistor R4. The other side of resistor R4 is coupled to ground. Output 120a is coupled to the collector of transistor Q2 and provides an output signal to an information gathering system coupled thereto.

In operation, the power source $V_{CC1}$ supplies base drive for transistor Q1. Transistor Q1 is biased in forward-active mode. This means that the base-emitter junction of transistor Q1 is forward-biased and the base-collector is reversed-biased. Since the collector current of a linear transistor, in the active mode, is independent of the base-collector voltage (as long as the base-junction is reversed biased), the collector of transistor Q1 behaves as an ideal current sink. More specifically, the predetermined voltage amount of power supply $V_{CC1}$ and the value of resistor R1 are used to set an emitter current of transistor Q1. Additionally, a collector current is defined to be approximately equal to the emitter current of transistor Q1 in a forward-active mode. This means that regardless of any voltage at the collector of transistor Q1, the collector current of transistor Q1 remains constant.

For example, if two-wire active sensor 12 sends the sensor current signal equal to 7 mA and transistor Q1 is set to draw 10 mA (the constant current amount), transistor Q1 will draw substantially all of the sensor current signal or 7 mA sent from the two-wire active sensor 12. Additionally, transistor Q1 will drain the remaining current or 3 mA from power supply $V_{CC2}$ through a base-emitter of transistor Q2 and resistor R2. This causes transistor Q2 to turn ON and produce the high voltage output at the collector of transistor Q2 that is equal to an emitter voltage of transistor Q2. The high voltage is received by the information gathering system for an appropriate processing.

If the sensor current signal generated by the two-wire active sensor 12 is greater than the constant current amount, transistor Q1 will draw an amount of current equal to the constant current amount. Additionally, if only a portion of the constant current amount is drained, any remaining flows to the digital interface circuit 120. For example, if the two-wire active sensor 12 outputs a sensor current signal equal to 14 mA, and transistor Q1 is set to draw 10 mA (the constant current amount), transistor Q1 will not take any more current than the constant current amount. The remaining current equal to or about 4 mA will travel through the resistor R2 and diode D1. A voltage across diode D1 (approximately 0.7 V) is added to power supply $V_{CC2}$ voltage causing transistor Q2 to operate in the cutoff region and switch from ON to OFF. When transistor Q2 turns OFF, the low voltage output is transmitted to the information gathering system.

The resultant pulse train having pulses transitioning between high and low voltage outputs of digital interface circuit 20 is coupled to an information gathering system for determination of the physical quality being monitored by sensor 12. For example, when sensor 12 is used as a vehicle wheel speed sensor, the frequency of the pulse train output by interface circuit 20 is indicative of the angular speed of a vehicle wheel being monitored.

Figure 3:
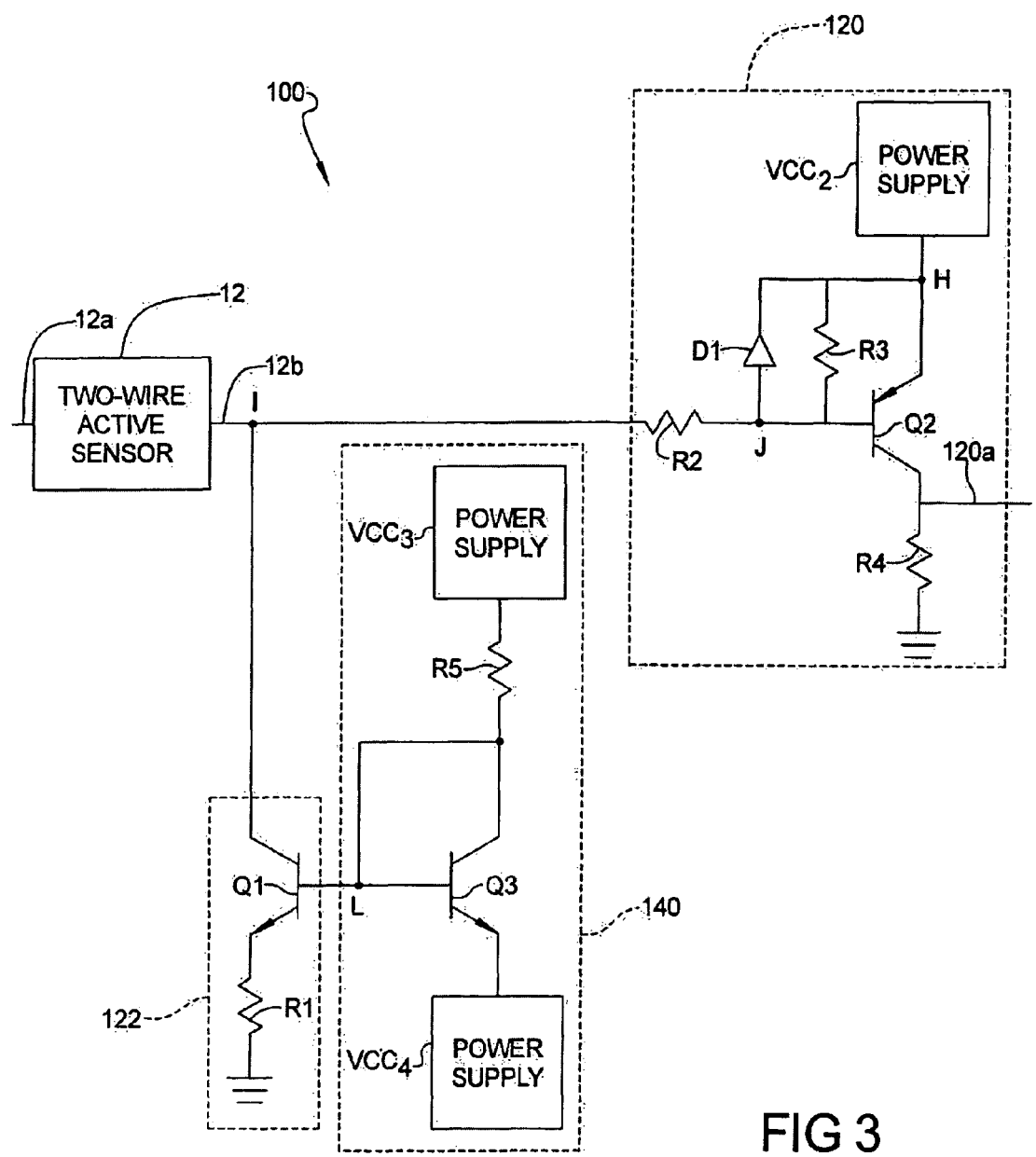

In a moderate ambient temperature environment, the performance of the constant current circuit 122 is consistent and accurate. In hot and cold ambient temperatures, however, the constant current circuit 122 may include temperature sensitive parameters that may affect the performance of the constant current circuit 122. For example, when using transistor Q1, the base-emitter voltage varies as ambient temperatures enter into hot and cold temperatures. Referring to FIG. 3, an alternative embodiment of the two-wire active sensor interface module 100 is provided. The two-wire active sensor interface module 100 may further comprise a temperature compensator 140 used to stabilize the performance of the constant current circuit 122 during hot and cold ambient temperatures. The temperature compensator 140 is operative to stabilize the amount of current pulled to ground by the constant current circuit 122 as temperature fluctuates to hot and cold ambient temperatures.

The temperature compensator 140 includes an NPN transistor. The NPN transistor is an identical transistor in features and function to transistor Q1. Additionally, the temperature compensator 140 converts the constant current circuit into a current mirror circuit. Power supply $V_{CC1}$ is removed from the base of transistor Q1 of the constant current circuit 122, such that the base of transistor Q1 is coupled to a base of transistor Q3 of the temperature compensator 140 at point L. A collector of transistor Q3 is coupled to its base and is coupled to one side of a resistor R5. The other side of resistor R5 is coupled to a power supply $V_{CC3}$. An emitter of transistor Q3 is coupled to a power supply $V_{CC4}$.

In operation, the emitter current of transistor Q1 is set by the voltage value of resistor R1, $V_{BEQ1}$ of transistor Q1, $V_{BEQ3}$ of transistor Q3, and an amount of voltage produced by power supply $V_{CC4}$. Using Kirchhoff's voltage law equation around the B-E loop of transistors Q1 and Q3:

$$V_{CC4} + V_{BEQ3} - V_{BEQ1} - V_{EQ1} = 0$$

where $V_{CC4}$ is a voltage produced by power supply $V_{CC4}$, $V_{BEQ3}$ is a voltage of the base-emitter junction regarding transistor Q3, $V_{BEQ1}$ a voltage of base-emitter junction regarding transistor Q1, and $V_{BEQ1}$ is a voltage at the emitter of transistor Q1.

As shown above, if the $V_{BEQ3}$ of transistor Q3 and the $V_{BEQ1}$ of transistor Q1 change with temperature in the same way, the net effect on the emitter current of transistor Q1 is nominal. This causes the constant current to remains unchanged as hot and cold ambient temperatures occur.

Typical values and identifications of the described elements are listed as follows, these being typical only:

TABLE 1

| Device | Value or Part number |
|---|---|
| Wheel Speed Two-Wire Active Sensor | P/N: 0265007601 |
| | Low current signal = 7 mA |
| | High current signal = 14 mA |
| Constant Current Circuit | Current Threshold = 10 mA |
| Q1 | 2N4401 |
| Q2 | 2N4403 |
| Q3 | 2N4401 |
| R1 | 150 Ω |
| R2 | 10 kΩ |
| R3 | 10 kΩ |
| R4 | 330 Ω |
| Power Supply $V_{cc1}$ | 5 V |
| Power Supply $V_{cc2}$ | 1.5 V |
| Power Supply $V_{cc3}$ | 5.0 V |
| Power Supply $V_{cc4}$ | 1.5 V |

As shown above, the two-wire active sensor interface circuit 100 of FIG. 2 or 3 is advantageous over the prior art two-wire active sensor interface circuit 10 of FIG. 1 in reducing the number of components and minimizing cost to produce a more robust and cost effective two-wire active sensor interface circuit.

The description of the present invention is merely exemplary in nature and, thus, variations that do not depart from the gist of the invention are intended to be within the scope of the invention. For example, the constant current module may include a current source circuit having a PNP transistor. Therefore, such variations are not to be regarded as a departure from the spirit and scope of the invention.

What is claimed is:

1. A two-wire active sensor interface circuit comprising,
a constant current circuit adapted to be coupled to a two-wire active sensor for receipt of a sensor current signal indicating one of two sensor states, the constant current circuit having a preselected constant current amount positioned between the two sensor states that varies the sensor current signal thereby generating a current level indicator signal; and,
a digital interface circuit operably coupled to the constant current circuit for receipt of the current level indicator signal and operative to produce an interface output indicating which of the two sensor states is present;
wherein the constant current circuit drains a current amount from the digital interface circuit whenever the sensor current signal is less than the preselected constant current amount; and,
wherein the constant current circuit comprises a first transistor, wherein the digital interface circuit further comprises a second transistor comprising a control terminal that communicates with the first transistor without communicating with an intervening transistor, wherein the second transistor is a PNP transistor, and wherein the interface output is provided at a collector terminal of the second transistor; and
a diode and a resistance that communicate in parallel with an emitter terminal and a base terminal of the second transistor.

2. The two-wire active sensor interface circuit of claim 1, wherein a first sensor state comprises a low current level and a second sensor state comprise a high current level, wherein the preselected constant current amount is approximately halfway between the low current level and the high current level.

3. The two-wire active sensor interface circuit of claim 2, wherein the constant current circuit drains substantially all of the sensor current away from the digital interface circuit whenever the sensor current signal is less than the preselected constant current amount.

4. The two-wire active sensor Interface circuit of claim 2, wherein the digital interface circuit produces a high signal output when the two-wire active sensor produces the low current level.

5. The two-wire active sensor interface circuit of claim 2, wherein the digital interface circuit produces a low signal out when the two-wire active sensor produces the high current level 6. The two-wire active sensor interface circuit of claim 1, wherein the current level indicator signal comprises a voltage signal generated by an impedance element coupled to the digital interface circuit 7. The two-wire active sensor interface circuit of claim 1, wherein the constant current circuit is further operative to reduce the sensor current signal during a high voltage fault condition.

8. The two-wire active sensor interface circuit of claim 1, further comprising a temperature compensator operably coupled to the constant current circuit and operative to stabilize the preselected constant current amount as ambient temperatures fluctuates to hot and cold temperatures.

9. The two-wire active sensor interface circuit of claim 1, further comprising a two-wire active sensor operably coupled to the constant current circuit and the digital interface circuit, wherein the two-wire active sensor is operative to sense a change in value or in a physical quality through an input and outputting that change as the current signal.

10. The two-wire active sensor interface circuit of claim 1, wherein the constant current circuit comprises a current sink circuit and wherein the current sink circuit drains an amount of the sensor current signal equal to the preselected current amount whenever the sensor current signal is greater than the preselected current amount.

11. The two-wire active sensor interface circuit of claim 1, wherein the digital interface circuit produces a pulse train having pulses transitioning between first and second interface output levels respectively corresponding to first and second sensor states, and wherein frequency of pulses in the pulse train is representative of a speed of a vehicular wheel associated with the two-wire active sensor.

12. A two-wire active sensor interface circuit comprising,
a first transistor adapted to be coupled to an output of a two-wire active sensor for receipt of a current signal indicating one of two states of the two wire active sensor, wherein the first transistor sinks a predetermined constant current amount of the current signal to generate a current indicator; and,
a switching device coupled to the first transistor for generating a signal indicating one of two states of the two-wire active sensor;
wherein the first transistor drains current from the switching device when the current signal is less than the predetermined constant current amount; and,
wherein the switching device further comprises a switching transistor comprising a control terminal that communicates with the first transistor without communicating with an intervening transistor, wherein the switching transistor is a PNP transistor, and wherein the generated signal is provided at a collector terminal of the switching transistor; and
a diode and a resistance that communicate in parallel with an emitter terminal and a base terminal of the switching transistor.

13. The two-wire active sensor interface circuit of claim 12, wherein the first transistor is coupled to a resistor and a power source to set the predetermined constant current amount.

14. The two-wire active sensor interface circuit of claim 12, wherein the current signal comprises a low current level and a high current level, and wherein the predetermined constant current amount is set approximately halfway between the low current level and the high current level.

15. The two-wire active sensor interface circuit of claim 12, wherein the first transistor drains all of the current signal when the current signal is less than or equal to the predetermined constant current amount.

16. The two-wire active sensor interface circuit of claim 12, wherein the first transistor drains a portion of the current signal when the current signal is greater than the. predetermined constant current amount.

17. The two-wire active sensor interface circuit of claim 12, further comprising: a two-wire active sensor operably coupled to the first transistor and the switching device, wherein the two-wire active sensor is operative to sense a change in value or in a physical quality through an input and output that change as the current signal.

* * * * *